United States Patent
Shih et al.

(10) Patent No.: US 10,977,057 B2
(45) Date of Patent: Apr. 13, 2021

(54) ELECTRONIC APPARATUS CAPABLE OF COLLECTIVELY MANAGING DIFFERENT FIRMWARE CODES AND OPERATION METHOD THEREOF

(71) Applicant: VIA LABS, INC., New Taipei (TW)

(72) Inventors: Terrance Shiyang Shih, Milpitas, CA (US); Chin-Sung Hsu, New Taipei (TW)

(73) Assignee: VIA LABS, INC., New Taipei (TW)

( * ) Notice: Subject to any disclaimer, the term of this patent is extended or adjusted under 35 U.S.C. 154(b) by 599 days.

(21) Appl. No.: 15/876,205

(22) Filed: Jan. 22, 2018

(65) Prior Publication Data

US 2018/0210744 A1     Jul. 26, 2018

Related U.S. Application Data

(60) Provisional application No. 62/449,140, filed on Jan. 23, 2017.

(51) Int. Cl.
*G06F 9/455* (2018.01)
*G06F 12/10* (2016.01)
(Continued)

(52) U.S. Cl.
CPC ............ *G06F 9/45504* (2013.01); *G06F 8/65* (2013.01); *G06F 8/654* (2018.02); *G06F 12/10* (2013.01);
(Continued)

(58) Field of Classification Search
CPC ...... G06F 9/45504; G06F 8/654; G06F 12/10; G06F 8/65; G06F 2212/202;
(Continued)

(56) References Cited

U.S. PATENT DOCUMENTS 8,058,897 B1 * 11/2011 Lu ........................ G06F 30/34
   326/38
2005/0021968 A1 * 1/2005 Zimmer ............... G06F 21/572
   713/176
(Continued)

FOREIGN PATENT DOCUMENTS

CN   1761222   4/2006
CN   101290601   10/2008
(Continued)

OTHER PUBLICATIONS

"Office Action of China Counterpart Application," dated Apr. 15, 2019, p. 1-p. 7.
(Continued)

*Primary Examiner* — Rehana Perveen
*Assistant Examiner* — Steven W Crabb
(74) *Attorney, Agent, or Firm* — JCIPRNET

(57) ABSTRACT

An electronic apparatus and an operation method thereof are provided. The electronic apparatus includes a nonvolatile memory, a first integrated circuit and a second integrated circuit. The nonvolatile memory stores the first firmware code of the first integrated circuit and the second firmware code of the second integrated circuit. The first integrated circuit is coupled to a memory access interface of the nonvolatile memory to read the first firmware code and the second firmware code. The first integrated circuit has an emulation memory access interface to emulate an emulation memory. The second integrated circuit is coupled to the emulation memory access interface of the first integrated circuit. The second integrated circuit reads the second firmware code from the first integrated circuit via the emulation memory access interface.

22 Claims, 5 Drawing Sheets

(51) Int. Cl.
*G06F 8/65* (2018.01)
*G06F 8/654* (2018.01)

(52) U.S. Cl.
CPC ............. *G06F 2212/1041* (2013.01); *G06F 2212/151* (2013.01); *G06F 2212/202* (2013.01)

(58) Field of Classification Search
CPC ....... G06F 2212/1041; G06F 2212/151; G05B 19/054; G05B 2219/1103
See application file for complete search history.

(56) References Cited

U.S. PATENT DOCUMENTS

2008/0162838 A1  7/2008  Cho et al.
2008/0306723 A1* 12/2008  De Ambroggi .... G11C 13/0033
                                                703/21
2016/0306616 A1* 10/2016  Tomppo ................ G06F 9/4415

FOREIGN PATENT DOCUMENTS

| | | |
|---|---|---|
| CN | 101473438 | 7/2009 |
| CN | 101510245 | 8/2009 |
| CN | 102255376 | 11/2011 |
| CN | 102577021 | 7/2012 |
| CN | 102667716 | 9/2012 |
| CN | 102981997 | 3/2013 |
| CN | 103383676 | 11/2013 |
| CN | 204538401 | 8/2015 |
| JP | 2003208321 | 7/2003 |
| TW | 200622676 | 7/2006 |
| TW | 201423594 | 6/2014 |
| TW | 201510858 | 3/2015 |
| WO | 2016132416 | 8/2016 |
| WO | 2016175847 | 11/2016 |

OTHER PUBLICATIONS

"Office Action of Taiwan Counterpart Application", dated Nov. 8, 2018, p. 1-p. 6.

* cited by examiner

ELECTRONIC APPARATUS CAPABLE OF COLLECTIVELY MANAGING DIFFERENT FIRMWARE CODES AND OPERATION METHOD THEREOF

CROSS-REFERENCE TO RELATED APPLICATION

This application claims the priority benefit of U.S. provisional application Ser. No. 62/449,140, filed on Jan. 23, 2017. The entirety of the above-mentioned patent application is hereby incorporated by reference herein and made a part of this specification.

BACKGROUND OF THE INVENTION

1. Field of the Invention

The invention relates to an electronic apparatus and an operation thereof.

2. Description of Related Art

In the same electronic apparatus, a plurality of co-processing integrated circuits are usually disposed therein. These integrated circuits execute different firmware codes, respectively. Given that the integrated circuits are often provided by different manufacturers, the different firmware codes of these integrated circuits are often stored in different memory chips. For instance, an integrated circuit A, a memory chip A, an integrated circuit B and a memory chip B may be disposed in the same electronic apparatus. Among them, the integrated circuit A is directed coupled to the memory chip A, and the integrated circuit B is directly coupled to the memory chip B. The integrated circuit A directly reads a firmware code A from the memory chip A, and executes the firmware code A to provide a function A. The integrated circuit B directly reads a firmware code B from the memory chip B, and executes the firmware code B to provide a function B in order to operate in collaboration with the function A of the integrated circuit A. In any case, the different firmware codes of the different integrated circuits are all stored in the different memory chips in the conventional electronic apparatus. It can be predictable that, these memory chips will occupy area of a printed circuit board and increase manufacturing costs.

Moreover, when a user intends to update firmware for the integrated circuits in the same electronic apparatus (e.g., update the firmware code A and the firmware code B), because these firmware codes are stored in the different memory chips, the user needs to use different tools/programs in order to update firmware for the different integrated circuits. For instance, it is assumed that the user needs to update the firmware code A for the memory chip A by using an updating tool A. After the firmware code A is updated, the user needs to update the firmware code B for the memory chip B by using another updating tool B. It can be imagined that updating the firmware will be a cumbersome and inefficient task to do for the conventional electronic apparatus.

SUMMARY OF THE INVENTION

The invention is directed to an electronic apparatus and an operation method thereof, which are capable of collectively managing different firmware codes for a plurality of integrated circuits.

An electronic apparatus is provided according to the embodiments of the invention. The electronic apparatus includes a nonvolatile memory, a first integrated circuit and a second integrated circuit. The non-volatile memory has a memory access interface. The nonvolatile memory can store the first firmware code of the first integrated circuit and the second firmware code of the second integrated circuit. The first integrated circuit is coupled to a memory access interface of the nonvolatile memory to read the first firmware code and the second firmware code. The first integrated circuit has a first emulation memory access interface to emulate an emulation memory. The second integrated circuit is coupled to the first emulation memory access interface of the first integrated circuit. The second integrated circuit reads the second firmware code from the first integrated circuit via the first emulation memory access interface.

An operating method of an electronic apparatus is provided according to the embodiments of the invention. The operating method includes: storing a first firmware code of a first integrated circuit and a second firmware code of a second integrated circuit by a nonvolatile memory; reading the first firmware code from the nonvolatile memory by the first integrated circuit; providing a first emulation memory access interface to emulate a first emulation memory by the first integrated circuit; reading the second firmware code from the nonvolatile memory by the first integrated circuit; and reading the second firmware code from the first integrated circuit via the first emulation memory access interface by the second integrated circuit.

Based on the above, with the electronic apparatus and the operation method thereof provided according to various embodiments of the invention, one nonvolatile memory is used to store different firmware codes for the integrated circuits. The first integrated circuit can read the first firmware code from the nonvolatile memory, and execute the first firmware code. The first integrated circuit provides the emulation memory access interface to emulate one emulation memory. In this way, the second integrated circuit can read the second firmware code in the nonvolatile memory via the first integrated circuit, and execute the second firmware code. As a result, the different firmware codes of the integrated circuits may be stored together in the same nonvolatile memory, such that the firmware codes may be managed collectively.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
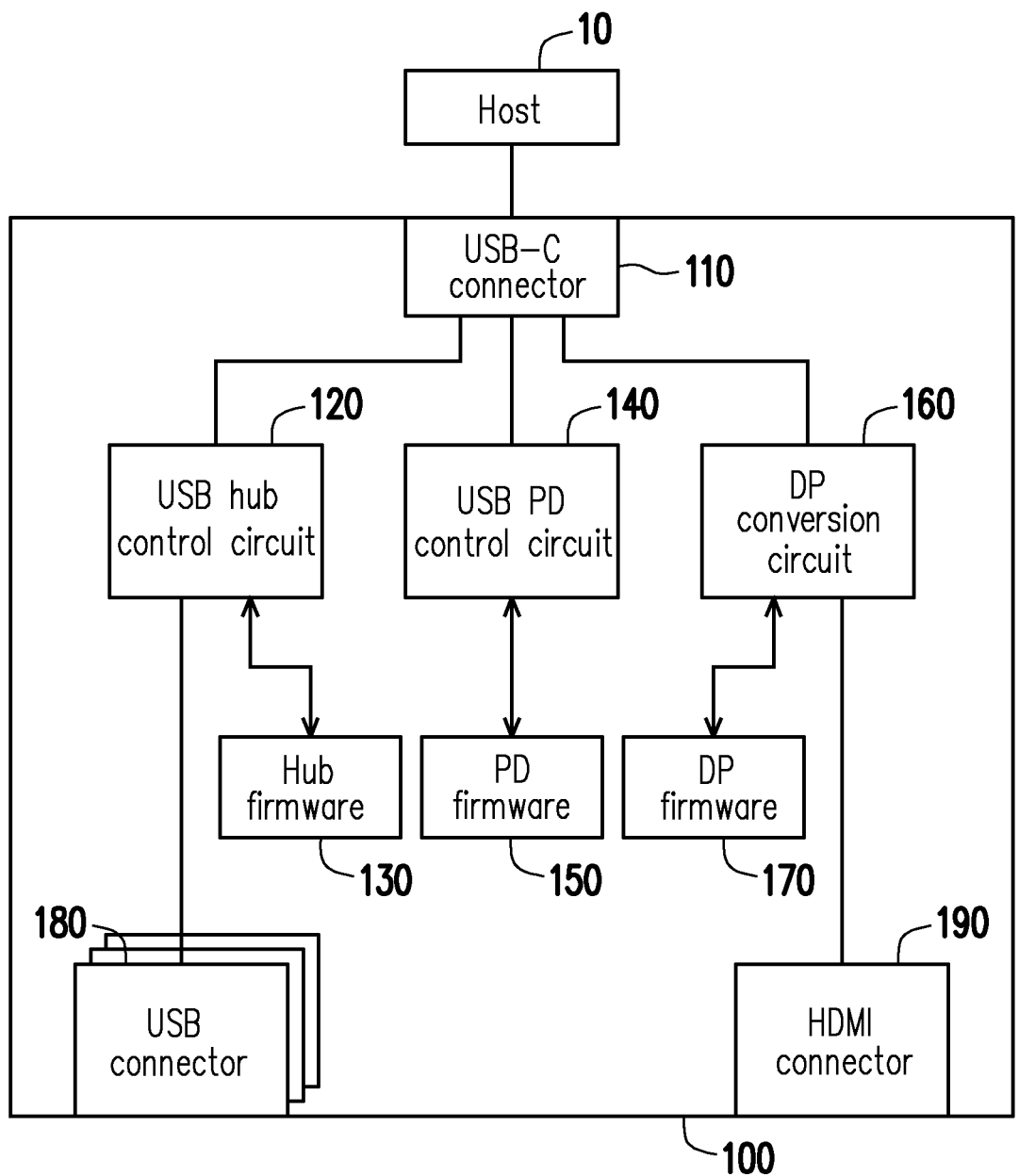
FIG. 1 illustrates a circuit block diagram of a USB-C hub.

Reference will now be made in detail to the present preferred embodiments of the invention, examples of which are illustrated in the accompanying drawings.

Wherever possible, the same reference numbers are used in the drawings and the description to refer to the same or like parts.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". Moreover, elements/components/steps with same reference numerals represent same or similar parts in the drawings and embodiments. Elements/components/steps with the same reference numerals or names in different embodiments may be cross-referenced.

USB Type-C (a.k.a. USB-C) is a new transmission interface of Universal Serial Bus (USB). FIG. 1 illustrates a circuit block diagram of a USB-C hub 100. In other different embodiments, the USB-C hub 100 may be a multi-function dock or other electronic device. The USB-C hub 100 includes an upstream-facing port (UFP) 110, a USB hub control circuit 120, a memory chip 130, a USB power delivery (PD) control circuit 140, a memory chip 150, a DisplayPort (DP) conversion circuit 160, a memory chip 170, a downstream-facing port (DFP) 180 and a high definition multimedia interface (HDMI) connector 190. The upstream facing port 110 may be connected to a host 10. The host 10 may be a personal computer, a notebook computer, a tablet computer, a hand-held phone, a personal digital assistant (PDA), a media player, a digital camera, a camcorder, a game console, etc.

The USB hub control circuit 120 is coupled to a data pin of the upstream facing port 110. The data pin may be D pins (a pair of pins for differential signals) and/or TX1 pins (a pair of output pins for differential signals) and RX1 pins (a pair of input pins for differential signals). The USB hub control circuit 120 is also coupled to the downstream facing port 180. The memory chip 130 stores a hub firmware code. The USB hub control circuit 120 can execute the hub firmware code provided by the memory chip 130 so as to provide a USB hub function.

The USB PD control circuit 140 is coupled to a configuration channel pin (CC pin) of the upstream facing port 110. The memory chip 150 stores a PD firmware code. The USB PD control circuit 140 can execute the PD firmware code provided by the memory chip 150 so as to provide a PD control function. For instance, based on the PD firmware code, the USB PD control circuit 140 is able to detect a status of the CC pin of the upstream facing port 110, so as to determine whether the upstream facing port 110 is connected to an external device (e.g., the host 10 shown in FIG. 1). The USB-C hub 100 can exchange configuration information with the host 10 via the CC pin. According to the configuration information, the USB-C hub 100 can automatically share protocols with the host 10, so as to decide that the host 10 acts as a provider in power delivery and the USB-C hub 100 acts as a receiver in power delivery.

The DP conversion circuit 160 is coupled to other data pins of the upstream facing port 110. For instance, the DP conversion circuit 160 may be coupled to TX2 pins (another pair of output pins for differential signals) and RX2 pins (another pair of input pins for differential signals) of the upstream facing port 110, and the TX2 pins and the RX2 pins may be treated as DP pins. The DP conversion circuit 160 is also coupled to the high definition multimedia interface (HDMI) connector 190. The memory chip 170 stores a DisplayPort (DP) firmware code. The DP conversion circuit 160 can execute the DP firmware code provided by the memory chip 170 so as to provide a "DP to HDMI" conversion function.

In any case, in the USB-C hub 100, the different firmware codes of the different integrated circuits are stored in the different memory chips (e.g., the memory chips 130, 150 and 170 shown in FIG. 1). It can be predictable that, these memory chips 130, 150 and 170 will occupy area on a printed circuit board and increase manufacturing costs. Moreover, when it is required to update the firmware codes of the integrated circuits 130, 150 and 170, since these firmware codes are stored in the different memory chips, the user needs to use different tools/programs in order to update firmware for the different integrated circuits 130, 150 and 170, respectively. For instance, it is assumed that the user currently needs to update the hub firmware code for the memory chip 130 by using an updating tool A. After the hub firmware code is updated, the user needs to update the PD firmware code for the memory chip 150 by using another updating tool B. After the PD firmware code is updated, the user needs to update the DP firmware code for the memory chip 170 by using another updating tool C. It can be imagined that updating the firmware will be a cumbersome and inefficient task to do for the USB_C hub 100.

Figure 2:
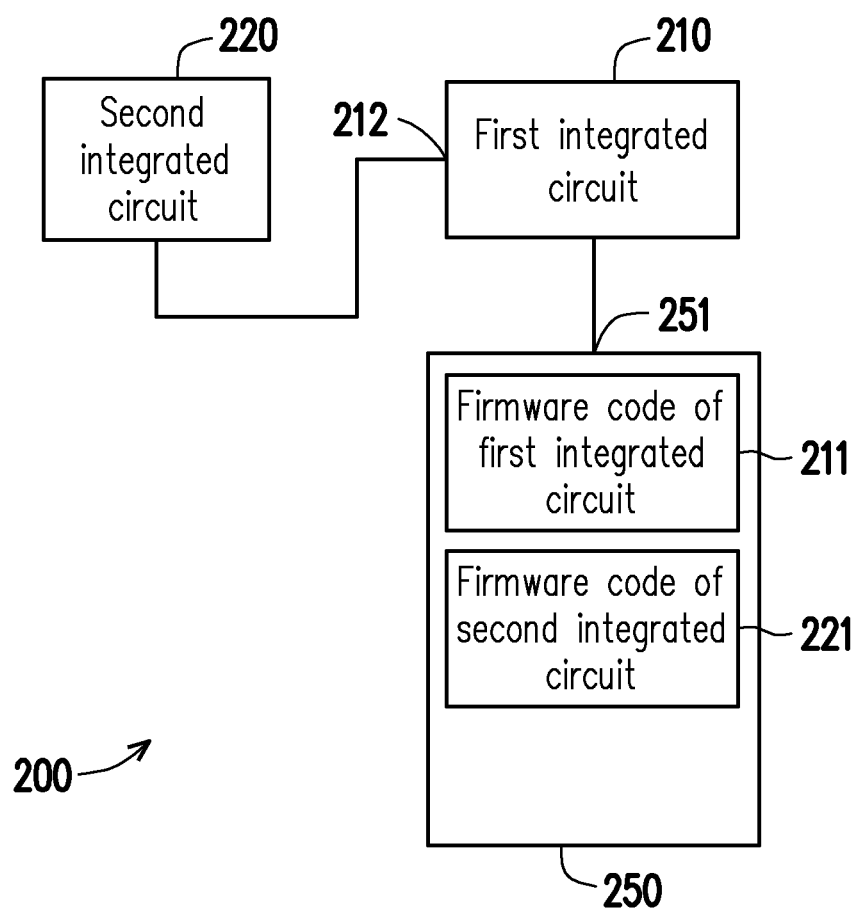
FIG. 2 is a circuit block diagram illustrating an electronic apparatus according to an embodiment of the invention.

FIG. 2 is a circuit block diagram illustrating an electronic apparatus 200 according to an embodiment of the invention. The electronic apparatus 200 includes a first integrated circuit 210, a second integrated circuit 220 and a nonvolatile memory 250. The first integrated circuit 210 and the second integrated circuit 220 may be any type of processing/control circuits capable of operating in collaboration with each other. For instance, the first integrated circuit 210 and/or the second integrated circuit 220 may be a controller, a micro controller, a microprocessor, an application-specific integrated circuit (ASIC), a digital signal processor (DSP), a field programmable gate array (FPGA) or other processing/control circuits.

Based on design requirements, the nonvolatile memory 250 may be an NAND flash memory or other non-volatile memory circuits/devices. The non-volatile memory 250 has a memory access interface 251. The nonvolatile memory 250 can store a firmware code of the first integrated circuit 210 (hereinafter, a first firmware code 211) and a firmware code of the second integrated circuit 220 (hereinafter, a second firmware code 221). The first integrated circuit 210 is coupled to the memory access interface 251 of the nonvolatile memory 250. Based on design requirements, the memory access interface 251 may be a serial peripheral interface (hereinafter, SPI) or other firmware access interfaces.

The first integrated circuit 210 has a first emulation memory access interface 212 to emulate one emulation memory. Based on design requirements, the first emulation memory access interface 212 may be the SPI or other firmware access interfaces. The second integrated circuit 220 is coupled to the first emulation memory access interface 212 of the first integrated circuit 210. Accordingly, for the second integrated circuit 220, the second integrated circuit 220 will assume that the first integrated circuit 210 is one nonvolatile memory (the emulation memory).

Figure 3:
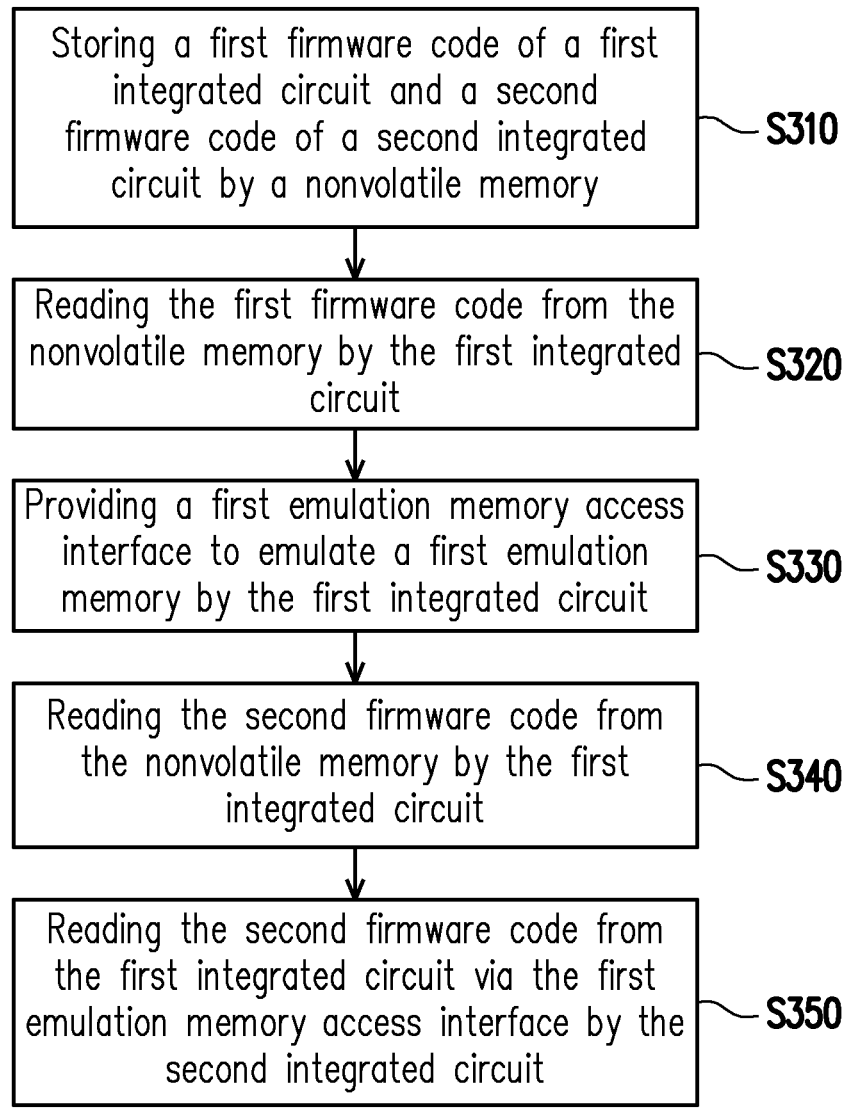
FIG. 3 is a flowchart of an operation method of the electronic apparatus according to an embodiment of the invention.

FIG. 3 is a flowchart of an operation method of the electronic apparatus 200 according to an embodiment of the invention. With reference to FIG. 2 and FIG. 3, the nonvolatile memory 250 can store the first firmware code 211 of the first integrated circuit 210 and the second firmware code 221 of the second integrated circuit 220 in step S310. In step S320, the first integrated circuit 210 can read the first firmware code 211 from the nonvolatile memory 250. Accordingly, the first integrated circuit 210 can execute the first firmware code 211 to provide a first function. For instance, the first integrated circuit 210 can provide the first emulation memory access interface 212 to emulate one emulation memory in step S330.

In step S330, the first integrated circuit 210 can provide the first emulation memory access interface 212 (the emulation memory) for the second integrated circuit 220, such that the second integrated circuit 220 can send a read command to the emulation memory (the first integrated circuit 210) via the first emulation memory access interface 212 in order to read the second firmware code 221 of the second integrated circuit 220. Based on the read command of the second integrated circuit 220, the first integrated circuit 210 can read the second firmware code 221 from the nonvolatile memory 250 in step S340. In step S350, the second integrated circuit 220 can read the second firmware code 221 from the first integrated circuit 210 via the first emulation memory access interface 212. Accordingly, the second integrated circuit 220 can execute the second firmware code 221 to provide a second function in order to operate in collaboration with the first function of the first integrated circuit 210.

For instance, when the second integrated circuit 220 performs a firmware reading on the emulation memory (the first integrated circuit 210) via the first emulation memory access interface 212 using a first read address, the first integrated circuit 210 can convert the first read address into a second read address. The first integrated circuit 210 reads the second firmware code 221 from the nonvolatile memory 250 using the second read address. The first integrated circuit 210 returns the second firmware code 221 to the second integrated circuit 220 via the first emulation memory access interface 212.

A host (not illustrated) may also perform an identification operation on the electronic apparatus 200. When the host performs the identification operation on the electronic apparatus 200, the first integrated circuit 210 can receive an encrypted value provided by the host. The encrypted value is generated by encrypting one specific original value (e.g., a pseudo-random number) using a public key by the host. The first integrated circuit 210 can perform a decrypting operation on the encrypted value using a private key, so as to obtain a decrypted value. If the private key has a corresponding relationship with the public key, the decrypted value should be identical to the original value. The first integrated circuit 210 can return the decrypted value to the host. The host can compare whether the decrypted value is identical to the original value, and determine whether identity data or descriptor data of the electronic apparatus 200 is hypocritical according to a comparison result.

When the user intends to update firmware for the integrated circuits 210 and/or 220 in the electronic apparatus 200 (e.g., update the first firmware code 211 and/or the second firmware code 221), because the first firmware code 211 and the second firmware code 221 are stored in the same nonvolatile memory 250 (the memory chip), the user can update firmware for the nonvolatile memory 250 using the same updating tool/program. In this way, the first firmware code 211 and the second firmware code 221 may be updated collectively.

For instance, the user can use the updating tool/program to transmit a new firmware file to the first integrated circuit 210. The first integrated circuit 210 can verify the new firmware file in order to update the first firmware code 211 and/or the second firmware code 221 in the nonvolatile memory 250. The new firmware file is an encrypted firmware code encrypted by a private key in advance. Operation regarding "verify the new firmware file" is described as follow. The first integrated circuit 210 can perform a decrypting operation on the new firmware file using one public key corresponding to the private key, so as to obtain a decrypted file. When the decrypting operation is successful, the first integrated circuit 210 can update the first firmware code 211 and/or the second firmware code 221 in the nonvolatile memory 250 using a new first firmware code and/or a second firmware code in the decrypted file.

Figure 4:
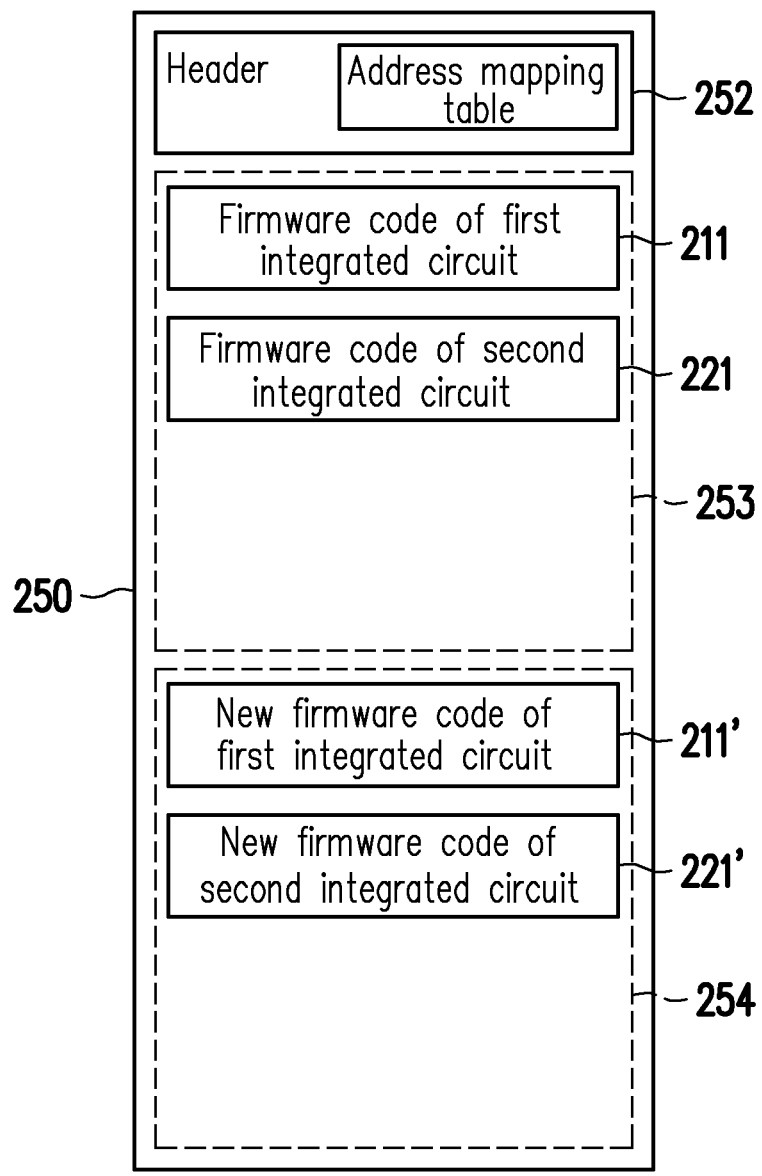
FIG. 4 is a schematic diagram illustrating an addressing space of the nonvolatile memory shown in FIG. 2 according to an embodiment of the invention.

FIG. 4 is a schematic diagram illustrating an addressing space of the nonvolatile memory 250 shown in FIG. 2 according to an embodiment of the invention. The nonvolatile memory 250 includes a header 252, a first region 253 and a second region 254. The first firmware code 211 and the second firmware code 221 may be stored in the first region 253. The header 252 has an address mapping table, which is configured to record an actual address of the first firmware code 211 in the nonvolatile memory 250, and record an actual address of the second firmware code 221 in the nonvolatile memory 250. The first integrated circuit 210 can read the address mapping table from the header 252 so as to obtain the actual address of the first firmware code 211. Accordingly, the first integrated circuit 210 can read the first firmware code 211 from the first region 253 of the nonvolatile memory 250, and execute the first firmware code 211.

When the second integrated circuit 220 performs a firmware reading on the emulation memory (the first integrated circuit 210) via the first emulation memory access interface 212 using a first read address, the first integrated circuit 210 can use the address mapping table of the header 252 to convert the first read address into a second read address (the actual address of the second firmware code 221 in the nonvolatile memory 250). The first integrated circuit 210 reads the second firmware code 221 from the first region 253 of the nonvolatile memory 250 using the second read address. Then, the first integrated circuit 210 returns the second firmware code 221 to the second integrated circuit 220 via the first emulation memory access interface 212. Accordingly, the second integrated circuit 220 can execute the second firmware code 221.

When the user intends to update firmware for the integrated circuits 210 and/or 220 in the electronic apparatus 200, because the first firmware code 211 and the second firmware code 221 are stored in the same nonvolatile memory 250 (the memory chip), the user can update firmware for the nonvolatile memory 250 using the same updating tool/program. For instance, in some embodiments, the user can use the updating tool/program to transmit a new first firmware code 211' of the first integrated circuit 210 and/or a new second firmware code 221' of the second integrated circuit 220 to the first integrated circuit 210 so the first integrated circuit 210 can temporarily store the new first firmware code 211' and/or the new second firmware code 221' to the second region 254 of the nonvolatile memory 250. The first integrated circuit 210 can verify the new first firmware code 211' and/or the new second firmware code 221' in order to update the first firmware code 211 and/or the second firmware code 221 in the first region 253. The new first firmware code 211' and/or the new second firmware code 221' are encrypted firmware codes encrypted by a private key in advance. The first integrated circuit 210 can perform a decrypting operation on the new first firmware code 211' and/or the new second firmware code 221' using one public key corresponding to the private key. When the decrypting operation is successful, the first integrated circuit 210 can update the first firmware code 211 and the second firmware code 221 in the first region 253 using the new first firmware code 211' and the new second firmware code 221' in the decrypted file. In this way, the first firmware code 211 and/or the second firmware code 221 may be updated collectively.

In other embodiments, the user can use a host to transmit the new first firmware code 211' and/or the new second firmware code 221' to the first integrated circuit 210. The host adds the new firmware code(s) and a digital signature into a packet (or a file) and transmits the packet to the first integrated circuit 210. The digital signature is a set of first hash values that have been previously encrypted by a private key. In an embodiment, the new firmware code (including header, excluding the digital signature) transmitted from the host is hashed in advance by hash operation to generate a hash result. The hash result is then encrypted by a private key to generate a set of first hash values which is the digital signature. The header contains total length, number of entries, addresses for each entry, option flags, and/or other information. The first integrated circuit 210 includes a hash processing circuit, which generates a hash result by hashing the new firmware code (excluding the digital signature) transmitted from the host. The first integrated circuit 210 further includes a public key, which is used to decrypt the received digital signatures then solve a set of second hash values. The first integrating circuit 210 compares whether the second hash values is the same as the hash result. If the result of the comparison is the same, the first integrated circuit 210 can temporarily store the new firmware code (for example, the new first firmware code 211' and/or the new second firmware code 221') transmitted by the host into the second region 254 of the nonvolatile memory 250. The first integrated circuit 210 can update the first firmware code 211 and the second firmware code 221 in the first region 253 using the new first firmware code 211' and the new second firmware code 221' in the second region 254. In this way, the first firmware code 211 and/or the second firmware code 221 may be updated collectively.

Figure 5:
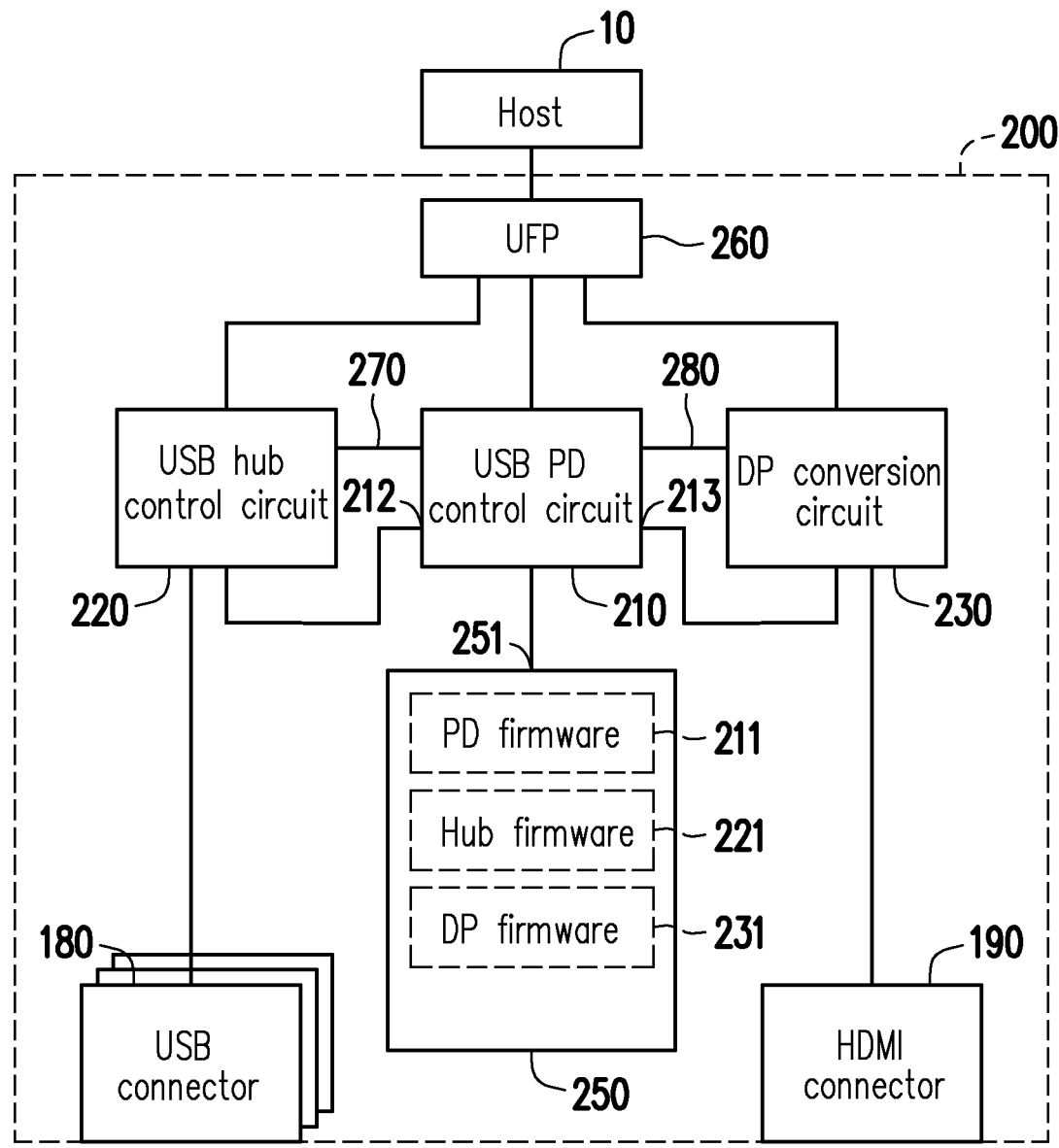
FIG. 5 illustrates a circuit block diagram of one embodiment of the electronic apparatus shown in FIG. 2.

FIG. 5 illustrates a circuit block diagram of one embodiment of the electronic apparatus 200 shown in FIG. 2. Based on design requirements, the electronic apparatus 200 may be implemented as a USB-C hub. In other different embodiments, the electronic apparatus 200 may be a multi-function dock or other electronic device. In the embodiment shown in FIG. 5, the electronic apparatus 200 includes an upstream facing port (UFP) 260, a first integrated circuit 210, a second integrated circuit 220, a third integrated circuit 230 and a nonvolatile memory 250. The upstream facing port 260 may be connected to a host 10. The first integrated circuit 210 includes a USB power delivery (PD) control circuit. The second integrated circuit 220 includes a USB hub control circuit. A data transmission between the USB PD control circuit and the USB hub control circuit may be performed via a USB type-C port controller interface (TCPCI) 270. The third integrated circuit 230 includes a DisplayPort (DP) conversion circuit. A data transmission between the third integrated circuit 230 and the first integrated circuit 210 may be performed via a general purpose input/output (abbr. GPIO) interface 280. The host 10, the upstream facing port 260, "the USB hub control circuit", "the USB PD control circuit" and "the DP conversion circuit" in the preset embodiment may refer to related descriptions for the host 10, the upstream facing port 110, the USB hub control circuit 120, the USB PD control circuit 140 and the DP conversion circuit 160 shown in FIG. 1, which are not repeated hereinafter.

The first integrated circuit 210 is coupled to a configuration channel pin (CC pin) of the upstream facing port 260. The second integrated circuit 220 is coupled to a data pin of the upstream facing port 260. The data pin may be D pins (a pair of pins for differential signals) and/or TX1 pins (a pair of output pins for differential signals) and RX1 pins (a pair of input pins for differential signals). The third integrated circuit 230 is coupled to other data pins of the upstream facing port 260. For instance, the third integrated circuit 230 may be coupled to TX2 pins (another pair of output pins for differential signals) and RX2 pins (another pair of input pins for differential signals) of the upstream facing port 260, and the TX2 pins and the RX2 pins may be treated as DP pins.

The nonvolatile memory 250 can store a first firmware code 211, a second firmware code 221 and a firmware code of the third integrated circuit 230 (hereinafter, a third firmware code 231). The first integrated circuit 210 can read the first firmware code 211 from the nonvolatile memory 250. Accordingly, the first integrated circuit 210 can execute the first firmware code 211 to provide a first function (e.g., a PD function). For instance, in the embodiment shown in FIG. 5, the first integrated circuit 210 can provide a first emulation memory access interface 212 to emulate one first emulation memory, and the first integrated circuit 210 can provide a second emulation memory access interface 213 to emulate one second emulation memory. Based on design requirements, the second emulation memory access interface 213 may be the SPI or other firmware access interfaces.

The second integrated circuit 220 can send a read command to the first emulation memory (the first integrated circuit 210) via the first emulation memory access interface 212 in order to read the second firmware code 221 of the second integrated circuit 220. Based on the read command of the second integrated circuit 220, the first integrated circuit 210 can read the second firmware code 221 from the nonvolatile memory 250. The second integrated circuit 220 can read the second firmware code 221 from the first integrated circuit 210 via the first emulation memory access interface 212. Accordingly, the second integrated circuit 220 can execute the second firmware code 221 to provide a second function (e.g., a hub function) in order to operate in collaboration with the first integrated circuit 210.

The third integrated circuit 230 is coupled to the second emulation memory access interface 213 of the first integrated circuit 210. Accordingly, for the third integrated circuit 230, the third integrated circuit 230 will assume that the first integrated circuit 210 is one nonvolatile memory (the second emulation memory). The third integrated circuit 230 can send a read command to the second emulation memory (the first integrated circuit 210) via the second emulation memory access interface 213 in order to read the third firmware code 231 of the third integrated circuit 230. Based on the read command of the third integrated circuit 230, the first integrated circuit 210 can read the third firmware code 231 from the nonvolatile memory 250. The third integrated circuit 230 can read the third firmware code 231 from the second emulation memory (the first integrated circuit 210) via the second emulation memory access interface 213. Accordingly, the third integrated circuit 230 can execute the third firmware code 231 to provide a third function (e.g., a DP conversion function) in order to operate in collaboration with the first integrated circuit 210.

Herein, it is assumed that the second integrated circuit 220 is a USB type-C port master (TCPM), and the first integrated circuit 210 is a USB type-C port controller (TCPC). Accordingly, when the electronic apparatus 200 shown in FIG. 5 operates in a normal operation mode, the second integrated circuit 220 (i.e., TCPM) gains a control authority in order to control the first integrated circuit 210 (i.e., TCPC) via the USB type-C port controller interface 270. When the host 10 updates the first firmware code 211, the second firmware code 221 and/or the third firmware code 231 for the electronic apparatus 200, an operation mode of the electronic apparatus 200 is switched from the normal operation mode to a firmware updating mode. In the firmware updating mode, the control authority is transferred from the second integrated circuit 220 (i.e., TCPM) to the first integrated circuit 210 (i.e., TCPC). Accordingly, the first integrated circuit 210 can receive a new first firmware code, a new second firmware code and/or a new third firmware code from the host 10 via the USB type-C port controller interface 270, the second integrated circuit 220 and the data pin of the upstream-facing port 260. The new first firmware code, the new second firmware code and/or the new third firmware code may be encrypted firmware codes encrypted by a private key in advance. The first integrated circuit 210 can verify the new first firmware code, the new second firmware code and/or the new third firmware code in order to update the first firmware code 211, the second firmware code 221 and/or the third firmware code 231 in the nonvolatile memory.

Operation for updating the new first firmware code, the new second firmware code and/or the new third firmware code is described as follow. The first integrated circuit 210 can perform a decrypting operation on the new first firmware code, the new second firmware code, and/or the new third firmware code using one public key corresponding to the private key, so as to obtain a decrypted new first firmware code, a decrypted new second firmware code and/or a decrypted new third firmware code. When the decrypting operation is successful, the first integrated circuit 210 can update the first firmware code 211, the second firmware code 221 and/or the third firmware code 231 in the nonvolatile memory 250 by using the decrypted new first firmware code, the decrypted new second firmware code and/or the decrypted new third firmware code.

The host 10 may also perform an identification operation on the electronic apparatus 200. When the host 10 performs the identification operation on the electronic apparatus 200, the second integrated circuit 220 can receive an encrypted value provided by the host 10 via the data pin of the upstream facing port 260. The encrypted value is generated by encrypting one specific original value (e.g., a pseudo-random number) using a public key by the host 10. The first integrated circuit 210 can receive the encrypted value from the second integrated circuit 220 via the USB type-C port controller interface 270. The first integrated circuit 210 can perform a decrypting operation on the encrypted value using a private key, so as to obtain a decrypted value. If the private key has a corresponding relationship with the public key, the decrypted value should be identical to the original value. The second integrated circuit 220 can return the decrypted value to the host 10 via the data pin of the upstream-facing port 260. The host can compare whether the decrypted value is identical to the original value, and determine whether identity data or descriptor data of the electronic apparatus 200 is hypocritical according to a comparison result.

It should be noted that, under different application scenarios, related functions of the first integrated circuit 210, the first firmware code 211, the second integrated circuit 220, the second firmware code 221, the third integrated circuit 230 and/or the third firmware code 231 can be implemented as software, firmware or hardware by utilizing common programming languages (e.g., C or C++), hardware description languages (e.g., Verilog HDL or VHDL) or other suitable programming languages. The programming language capable of executing the related functions can be arranged into any known computer-accessible media such as magnetic tapes, semiconductor memories, magnetic disks or compact disks (e.g., CD-ROM or DVD-ROM); or the programming language may be transmitted via the Internet, a wired communication, a wireless communication or other communication mediums. Said programming language may be stored in the computer-accessible media, so that a computer processor can access/execute programming codes of the software (or the firmware). For hardware implementation, various logical blocks, modules and circuits in one or more controllers, a microcontroller, an application-specific integrated circuit (ASIC), a digital signal processor (DSP), a field programmable gate array (FPGA) and/or other processing units may be utilized to realize or execute the function described in the embodiments the invention. In addition, the device and the method of the invention can also be implemented by a combination of software and hardware.

In summary, with the electronic apparatus 200 and the operation method thereof provided according to various embodiments of the invention, one nonvolatile memory 250 is used to store different firmware codes for the integrated circuits. The first integrated circuit 210 can read the first firmware code 211 from the nonvolatile memory 250, and execute the first firmware code 211. The first integrated circuit 210 provides the emulation memory access interface 212 to emulate one emulation memory. In this way, the second integrated circuit 220 can read the second firmware code 221 in the nonvolatile memory 250 via the first integrated circuit 210, and execute the second firmware code 221. As a result, the different firmware codes of the integrated circuits may be stored together in the same nonvolatile memory 250, such that the firmware codes may be managed collectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic apparatus, comprising:
a nonvolatile memory, having a memory access interface, and configured to store a first firmware code of a first integrated circuit and a second firmware code of a second integrated circuit;
the first integrated circuit, coupled to the memory access interface of the nonvolatile memory to read the first firmware code and the second firmware code, and having a first emulation memory access interface to emulate a first emulation memory; and
the second integrated circuit, coupled to the first emulation memory access interface of the first integrated circuit, wherein the second integrated circuit sends a first read command via the first emulation memory access interface to read the second firmware code from the first integrated circuit, wherein the first integrated circuit further comprises a second emulation memory access interface to emulate a second emulation memory, the nonvolatile memory is further configured to store a third firmware code of a third integrated circuit, the first integrated circuit further reads the third firmware code from the nonvolatile memory, and the electronic apparatus further comprises:

the third integrated circuit, coupled to the second emulation memory access interface of the first integrated circuit, wherein the third integrated circuit sends a second read command via the second emulation memory access interface to read the third firmware code from the first integrated circuit, and the third integrated circuit executes the third firmware code.

2. The electronic apparatus according to claim 1, wherein when the second integrated circuit performs a firmware reading on the first emulation memory via the first emulation memory access interface using a first read address, the first integrated circuit converts the first read address into a second read address, the first integrated circuit reads the second firmware code from the nonvolatile memory using the second read address, and the first integrated circuit returns the second firmware code to the second integrated circuit via the first emulation memory access interface.

3. The electronic apparatus according to claim 1, wherein the third integrated circuit executes the third firmware code to provide a DisplayPort conversion function.

4. The electronic apparatus according to claim 1, wherein the first integrated circuit executes the first firmware code to provide a power delivery function, and the second integrated circuit executes the second firmware code to provide a hub function.

5. The electronic apparatus according to claim 1, further comprising:

an upstream-facing port, configured to connect to a host, wherein the first integrated circuit is coupled to a configuration channel pin of the upstream-facing port, and the second integrated circuit is coupled to a data pin of the upstream-facing port.

6. The electronic apparatus according to claim 5, wherein the first integrated circuit comprises a USB power delivery control circuit, the second integrated circuit comprises a USB hub control circuit, and a data transmission between the USB power delivery control circuit and the USB hub control circuit is performed via a USB type-C port controller interface.

7. The electronic apparatus according to claim 6, wherein when the electronic apparatus operates in a normal operation mode, the second integrated circuit gains a control authority in order to control the first integrated circuit via the USB type-C port controller interface;

when the host updates the second firmware code of the second integrated circuit for the electronic apparatus, an operation mode of the electronic apparatus is switched from the normal operation mode to a firmware updating mode; and in the firmware updating mode, the control authority is transferred from the second integrated circuit to the first integrated circuit, the first integrated circuit receives a new second firmware code from the host via the USB type-C port controller interface, the second integrated circuit and the data pin of the upstream-facing port, and the first integrated circuit verifies the new second firmware code in order to update the second firmware code in the nonvolatile memory.

8. The electronic apparatus according to claim 7, wherein the new second firmware code is an encrypted firmware code encrypted by a private key, and the operation of verifying the new second firmware codes comprises:

performing a decrypting operation on the new second firmware code using a public key corresponding to the private key by the first integrated circuit, so as to obtain a decrypted new second firmware code; and when the decrypting operation is successful, updating the second firmware code in the nonvolatile memory using the decrypted new second firmware code by the first integrated circuit.

9. The electronic apparatus according to claim 6, wherein when the electronic apparatus operates in a normal operation mode, the second integrated circuit gains a control authority in order to control the first integrated circuit via the USB type-C port controller interface;

when the host updates the second firmware code of the second integrated circuit for the electronic apparatus, an operation mode of the electronic apparatus is switched from the normal operation mode to a firmware updating mode; and in the firmware updating mode, the control authority is transferred from the second integrated circuit to the first integrated circuit, the first integrated circuit receives a packet from the host via the USB type-C port controller interface, the second integrated circuit and the data pin of the upstream-facing port, the packet comprises a digital signature and a new second firmware code, and the first integrated circuit verifies the digital signature in order to update the second firmware code in the nonvolatile memory.

10. The electronic apparatus according to claim 9, wherein the digital signature includes a set of first hash values that have been previously encrypted by a private key, and the operation of updating the second firmware code in the nonvolatile memory comprises:

hashing the new second firmware code transmitted from the host to generate a hash result by the first integrated circuit;

decrypting the digital signatures using a public key by the first integrated circuit, so as to obtain a set of second hash values;

comparing whether the set of second hash values is the same as the hash result by the first integrated circuit, so as to obtain a comparison result; and when the comparison result is the same, updating the second firmware code in the nonvolatile memory using the new second firmware code by the first integrated circuit.

11. The electronic apparatus according to claim 6, wherein when the host performs an identification operation for the electronic apparatus, the second integrated circuit receives an encrypted value provided by the host via the data pin of the upstream-facing port, wherein the encrypted value is generated by encrypting an original value using a public key by the host;

the first integrated circuit receives the encrypted value from the second integrated circuit via the USB type-C port controller interface;

the first integrated circuit performs a decrypting operation on the encrypted value using a private key, so as to obtain a decrypted value; and the second integrated circuit returns the decrypted value to the host via the data pin of the upstream-facing port.

12. An operation method of an electronic apparatus, comprising:
    storing a first firmware code of a first integrated circuit and a second firmware code of a second integrated circuit by a nonvolatile memory;
    reading the first firmware code from the nonvolatile memory by the first integrated circuit;
    providing a first emulation memory access interface to emulate a first emulation memory by the first integrated circuit;
    reading the second firmware code from the nonvolatile memory by the first integrated circuit;
    sending a first read command via the first emulation memory access interface to read the second firmware code from the first integrated circuit by the second integrated circuit,
    providing a second emulation memory access interface to emulate a second emulation memory by the first integrated circuit;
    storing a third firmware code of a third integrated circuit by the nonvolatile memory;
    reading the third firmware code from the nonvolatile memory by the first integrated circuit; and
    sending a second read command via the second emulation memory access interface to read the third firmware code from the first integrated circuit by the third integrated circuit and executing the third firmware code by the third integrated circuit.

13. The operation method according to claim 12, wherein the step of reading the second firmware code from the first integrated circuit comprises:
    when the second integrated circuit performs a firmware reading on the first emulation memory via the first emulation memory access interface using a first read address, converting the first read address into a second read address by the first integrated circuit;
    reading the second firmware code from the nonvolatile memory using the second read address by the first integrated circuit; and
    returning the second firmware code to the second integrated circuit via the first emulation memory access interface by the first integrated circuit.

14. The operation method according to claim 12, further comprising:
    executing the third firmware code to provide a DisplayPort conversion function by the third integrated circuit.

15. The operation method according to claim 12, further comprising:
    executing the first firmware code to provide a power delivery function by the first integrated circuit; and
    executing the second firmware code to provide a hub function by the second integrated circuit.

16. The operation method according to claim 12, further comprising:
    providing an upstream-facing port, wherein the upstream-facing port is configured to connect to a host, the first integrated circuit is coupled to a configuration channel pin of the upstream-facing port, and the second integrated circuit is coupled to a data pin of the upstream-facing port.

17. The operation method according to claim 16, wherein the first integrated circuit comprises a USB power delivery control circuit, the second integrated circuit comprises a USB hub control circuit, and a data transmission between the USB power delivery control circuit and the USB hub control circuit is performed via a USB type-C port controller interface.

18. The operation method according to claim 17, further comprising:
    when the electronic apparatus operates in a normal operation mode, gaining a control authority by the second integrated circuit in order to control the first integrated circuit via the USB type-C port controller interface;
    when the host updates the second firmware code of the second integrated circuit for the electronic apparatus, switching an operation mode of the electronic apparatus from the normal operation mode to a firmware updating mode; and
    in the firmware updating mode, transferring the control authority from the second integrated circuit to the first integrated circuit, receiving a new second firmware code from the host via the USB type-C port controller interface, the second integrated circuit and the data pin of the upstream-facing port by the first integrated circuit, and verifying the new second firmware code by the first integrated circuit in order to update the second firmware code in the nonvolatile memory.

19. The operation method according to claim 18, wherein the new second firmware code is an encrypted firmware code encrypted by a private key, and the step of verifying the new second firmware codes comprises:
    performing a decrypting operation on the new second firmware code using a public key corresponding to the private key by the first integrated circuit, so as to obtain a decrypted new second firmware code; and
    when the decrypting operation is successful, updating the second firmware code in the nonvolatile memory using the decrypted new second firmware code by the first integrated circuit.

20. The operation method according to claim 17, further comprising:
    when the electronic apparatus operates in a normal operation mode, gaining a control authority by the second integrated circuit in order to control the first integrated circuit via the USB type-C port controller interface;
    when the host updates the second firmware code of the second integrated circuit for the electronic apparatus, switching an operation mode of the electronic apparatus from the normal operation mode to a firmware updating mode; and
    in the firmware updating mode, transferring the control authority from the second integrated circuit to the first integrated circuit, receiving a packet from the host via the USB type-C port controller interface, the second integrated circuit and the data pin of the upstream-facing port by the first integrated circuit, wherein the packet comprises a digital signature and a new second firmware code, and the first integrated circuit verifies the digital signature in order to update the second firmware code in the nonvolatile memory.

21. The operation method according to claim 20, wherein the digital signature includes a set of first hash values that have been previously encrypted by a private key, and the operation of updating the second firmware code in the nonvolatile memory comprises:
    hashing the new second firmware code transmitted from the host to generate a hash result by the first integrated circuit;
    decrypting the digital signatures using a public key by the first integrated circuit, so as to obtain a set of second hash values;

comparing whether the set of second hash values is the same as the hash result by the first integrated circuit, so as to obtain a comparison result; and when the comparison result is the same, updating the second firmware code in the nonvolatile memory using the new second firmware code by the first integrated circuit.

22. The operation method according to claim 17, further comprising:

performing an identification operation for the electronic apparatus by the host, wherein when the host performs the identification operation for the electronic apparatus,
receiving an encrypted value provided by the host via the upstream-facing port by the second integrated circuit, wherein the encrypted value is generated by encrypting an original value using a public key by the host;
receiving the encrypted value from the second integrated circuit via the USB type-C port controller interface by the first integrated circuit;
performing a decrypting operation on the encrypted value using a private key by the first integrated circuit, so as to obtain a decrypted value; and
returning the decrypted value to the host via the data pin of the upstream-facing port by the second integrated circuit.

* * * * *